United States Patent
Miyahara et al.

(10) Patent No.: US 9,803,718 B2
(45) Date of Patent: Oct. 31, 2017

(54) TORSIONAL VIBRATION REDUCING DEVICE

(71) Applicant: TOYOTA JIDOSHA KABUSHIKI KAISHA, Toyota-shi (JP)

(72) Inventors: Yu Miyahara, Susono (JP); Hiroyuki Amano, Susono (JP); Yuji Suzuki, Kariya (JP); Husahiro Tsukano, Susono (JP); Morihiro Matsumoto, Susono (JP); Atsushi Honda, Seto (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/960,981

(22) Filed: Dec. 7, 2015

(65) Prior Publication Data
US 2016/0169318 A1    Jun. 16, 2016

(30) Foreign Application Priority Data
Dec. 16, 2014  (JP) .................. 2014-253727

(51) Int. Cl.
*F16F 15/14* (2006.01)

(52) U.S. Cl.
CPC .................. *F16F 15/145* (2013.01)

(58) Field of Classification Search
CPC ...... F16F 15/14; F16F 15/145; Y10T 74/2128
See application file for complete search history.

(56) References Cited

U.S. PATENT DOCUMENTS

2012/0222515 A1*  9/2012  Kinoshita ............. F16F 15/145
                                              74/572.2
2013/0186724 A1*  7/2013  Miyahara .............. F16F 15/145
                                              192/3.23
2014/0066216 A1   3/2014  Tone et al.

FOREIGN PATENT DOCUMENTS

| DE | 102010054294 | * | 6/2011 |
| DE | 102011086526 | * | 6/2012 |
| JP | 07-280037 A |   | 10/1995 |
| JP | 2000-297843 A |   | 10/2000 |
| JP | 2013-148211 |   | 8/2013 |
| JP | 2014-47805 |   | 3/2014 |

* cited by examiner

*Primary Examiner* — Vishal Sahni
(74) *Attorney, Agent, or Firm* — Oblon, McClelland, Maier & Neustadt, L.L.P.

(57) ABSTRACT

A torsional vibration reducing device is provided. The torsional vibration reducing device includes a rotating body, a plurality of rolling bodies, and a connection member. The connection member connects the plurality of rolling bodies, and at least two contact portions are positioned on an inner surface of each of the plurality of accommodating portions, a portion of an outer peripheral surface of each of the plurality of rolling bodies being positioned in each of the plurality of accommodating portions, and the outer peripheral surface of each of the plurality of rolling bodies being configured to come into point contact with the contact portions in the circumferential direction of the rotating body.

10 Claims, 8 Drawing Sheets

TORSIONAL VIBRATION REDUCING DEVICE

INCORPORATION BY REFERENCE

The disclosure of Japanese Patent Application No. 2014-253727 filed on Dec. 16, 2014 including the specification, drawings and abstract is incorporated herein by reference in its entirety.

BACKGROUND OF THE INVENTION

1. Field of the Invention

The invention relates to a device that reduces torsional vibration by reciprocation of a rolling body.

2. Description of Related Art

One example of this type of device is described in Japanese Patent Application Publication No. 2014-47805. The device includes a plate member that is attached to a crankshaft of an engine. A recessed accommodating portion that is formed in an annular shape is formed in the plate member. A plurality of mass bodies that reciprocate by fluctuations in transmitted torque are disposed in the accommodating portion. The mass bodies are connected by connection members that are disposed along opposite side surfaces of the mass bodies.

Also, Japanese Patent Application Publication No. 2013-148211 describes a torsional vibration reducing device including an inertial mass body composed of a first pendulum member and a second pendulum member. Connection members are provided on opposite side surfaces of each of the pendulum members. The connection members of the pendulum members are connected to each other via a spring.

In a configuration described in JP 2014-47805 A, since the connection members are disposed along the opposite side surfaces of the mass bodies, the opposite side surfaces of the mass bodies and the connection members possibly come into contact with each other. When the torque fluctuates, the mass bodies reciprocate. In this case, if the opposite side surfaces of the mass bodies and the connection members come into contact with each other, sliding friction occurs between the opposite side surfaces of the mass bodies and the connection members, and the sliding friction produces resistance to hinder the reciprocation of the mass bodies. As a result, damping performance is possibly deteriorated. Also, since the connection members are disposed along the side surfaces of the mass bodies, an axial length of the torsional vibration reducing device is possibly increased corresponding to a thickness of the connection members. The inconveniences may be also similarly caused in the invention described in JP 2013-148211 A.

SUMMARY OF THE INVENTION

This invention provides a torsional vibration reducing device which reduces sliding friction between a rolling body and a connection member that connects rolling bodies with each other.

A torsional vibration reducing device includes a rotating body, a plurality of rolling bodies, and a connection member. The rotating body is configured to receive torque and rotate, and has a plurality of guide holes. The plurality of guide holes is provided at a predetermined interval in a circumferential direction of the rotating body. The plurality of rolling bodies is accommodated in the plurality of guide holes, respectively. Each of the plurality of rolling bodies is configured to reciprocate in the circumferential direction of the rotating body when the torque fluctuates in a state in which the rotating body is rotating. The connection member connects the plurality of rolling bodies. The connection member includes a plurality of accommodating portions. At least two contact portions are positioned on an inner surface of each of the plurality of accommodating portions. A portion of an outer peripheral surface of each of the plurality of rolling bodies is positioned in each of the plurality of accommodating portions, and the outer peripheral surface of each of the plurality of rolling bodies is configured to come into point contact with the contact portions in the circumferential direction of the rotating body.

A torsional vibration reducing device includes a rotating body, a plurality of rolling bodies, and a connection member. The rotating body is configured to receive torque and rotate, and has a plurality of guide holes. The plurality of guide holes is provided at a predetermined interval in a circumferential direction of the rotating body. The plurality of rolling bodies is accommodated in the plurality of guide holes, respectively. Each of the plurality of rolling bodies is configured to reciprocate in the circumferential direction of the rotating body when the torque fluctuates in a state in which the rotating body is rotating. The connection member connects the plurality of rolling bodies. The connection member includes a plurality of accommodating portions. At least two contact portions are positioned on an inner surface of each of the plurality of accommodating portions. A portion of an outer peripheral surface of each of the plurality of rolling bodies is positioned in each of the plurality of accommodating portions, and the outer peripheral surface of each of the plurality of rolling bodies is configured to come into line contact with the contact portions in the circumferential direction of the rotating body.

According to the above aspects of the invention, each of the contact portions may be configured to come into contact with the outer peripheral surface of each of the plurality of rolling bodies at a position on an outer side with respect to the center of gravity of each of the rolling bodies in a radial direction of the rotating body and on opposite sides of the center of gravity in the circumferential direction of the rotating body.

According to the above aspects of the invention, the connection member may be disposed on each of opposite sides of the rotating body in an axial direction of the rotating body.

According to the above aspects of the invention, the rotating body may include a rolling surface. The rolling surface may be a surface on an outer side in a radial direction of the rotating body in an inner surface of each of the plurality of guide holes. Each of the plurality of rolling bodies may include a body portion and a flange portion. The body portion may have a cylindrical shape, and a length of the body portion in the axial direction of the rotating body may be larger than a width of the rolling surface. The flange portion may have a disk shape. The flange portion may be provided on opposite end portions of the body portion in the axial direction of the rotating body, and the plurality of accommodating portions may hold the plurality of rolling bodies in contact with outer peripheral surfaces of the flange portions.

In accordance with the present invention, the two contact portions of the connection member come into point contact or line contact with the outer peripheral surface of the rolling body. Therefore, a contact area between the rolling body and the connection member can be reduced as compared to a case in which the connection member is disposed along a side surface of the rolling body, and the rolling body and the connection member are in surface contact with each other. Accordingly, it is possible to reduce sliding friction between the rolling body and the connection member when the rolling body reciprocates with the fluctuations in the transmitted torque. It is also possible to suppress a situation in which the sliding friction produces resistance to hinder the reciprocation of the rolling body. As a result, damping performance can be improved. Also, since the accommodating portion of the connection member holds the rolling body from the outer peripheral surface side, an increase in an axial length of the torsional vibration reducing device can be suppressed as compared to a case in which the connection member is disposed along the side surface of the rolling body. Moreover, it is not necessary to provide a configuration for connecting the rolling bodies in the rolling body, and a machining cost of the rolling body can be correspondingly reduced. The two contact portions come into point contact or line contact with the outer peripheral surface on the outer side with respect to the center of gravity of the rolling body in the radial direction of the rotating body and on the opposite sides with the center of gravity of the rolling body therebetween in the circumferential direction of the rotating body. Accordingly, it is possible to suppress escape of the rolling body from the connection member. Also, by disposing the connection members on the opposite sides of the rotating body, a load associated with contact between the outer peripheral surface of the rolling body and the connection members can be applied to the opposite end portions of the rolling body. As a result, the rolling body can be stably reciprocated along the rolling surface, so that the damping performance can be further improved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

Figure 3:
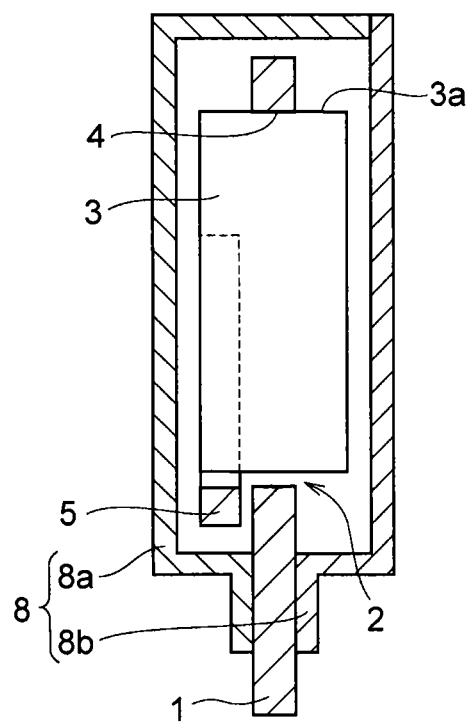
FIG. 3 is a sectional view in a rotating body radial direction illustrating a portion in one example of a torsional vibration reducing device according to the first embodiment.

FIG. 3 is a sectional view illustrating a portion in one example of a torsional vibration reducing device according to a first embodiment. The torsional vibration reducing device includes a rotating body 1 that is attached to an object to be damped. The rotating body 1 is a disk-shaped member. Circumferentially-long guide holes 2 are formed at positions radially shifted from the center of rotation of the rotating body 1. The guide holes 2 are formed passing through the rotating body 1 in a plate thickness direction. The guide holes 2 are positioned at predetermined intervals in a circumferential direction of the rotating body 1. As one example, eight guide holes are provided. The guide holes 2 have a shape formed by curving an oval shape or an elliptical shape.

A rolling body 3 that reciprocates by an inertial force when torque transmitted to the rotating body 1 fluctuates is inserted into each of the guide holes 2. The rolling body 3 is pressed against an inner surface of the guide hole 2 on an outer side in a radial direction of the rotating body 1, that is, a rolling surface 4 by a centrifugal force when the rotating body 1 rotates. The rolling body is configured to roll along the rolling surface 4. A portion of the rolling body 3 in contact with the rolling surface 4 has a circular shape in section in a rolling body axial direction. Therefore, the rolling body 3 may be a member having a simple disk or cylindrical shape. The rolling body 3 may be also formed in an "H" shape in section so as not to escape from the guide hole 2 in an axial direction of the rotating body. That is, disk-shaped flange portions having a larger outer diameter than an outer diameter of a body portion of the rolling body 3 may be provided on opposite end portions of the body portion in the axial direction of the rotating body 1. The disk-shaped flange portions may be caught by side surfaces of the rotating body 1.

The rolling bodies 3 are connected together by a connection member 5 so as to be reciprocatable on the rolling surfaces 4, respectively. In the example shown in FIG. 3, the connection member 5 is disposed on one axial side of the rolling body 3 and on an inner side of the rolling body 3 in the radial direction of the rotating body 1. A side surface of the connection member 5 and a side surface of the rolling body 3 are arranged substantially flush with each other.

Figure 1:
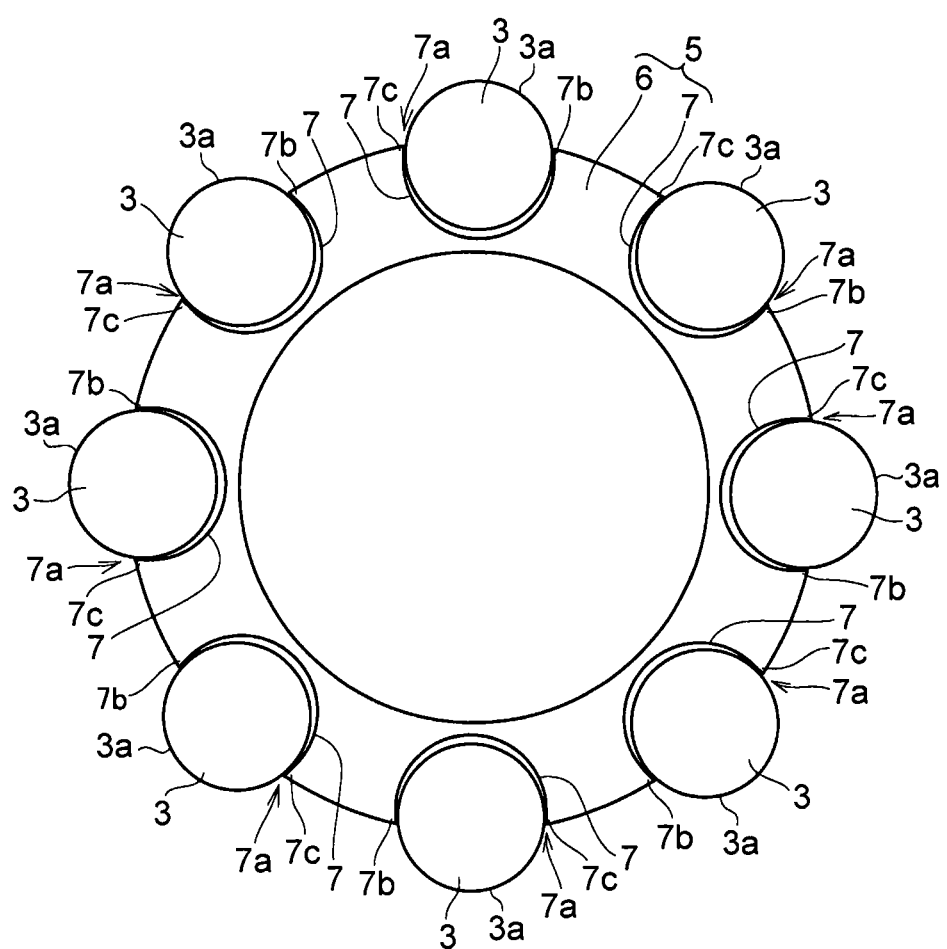
FIG. 1 is a view illustrating one example of a connection member according to a first embodiment.

FIG. 1 is a view illustrating one example of the connection member according to the first embodiment. The connection member 5 shown in FIG. 1 includes an annular support portion 6. Accommodating portions 7 that hold the rolling bodies 3 are formed at positions circumferentially corresponding to the guide holes 2 in the support portion 6. In the example shown therein, the eight accommodating portions 7 are formed. The accommodating portions 7 have semicircular inner surfaces, and open outward in the radial direction of the rotating body 1 in the example shown in FIG. 1. The rolling bodies 3 are fitted into the accommodating portions 7. That is, the rolling bodies 3 are held along outer peripheral surfaces 3a of the rolling bodies 3.

Figure 2:
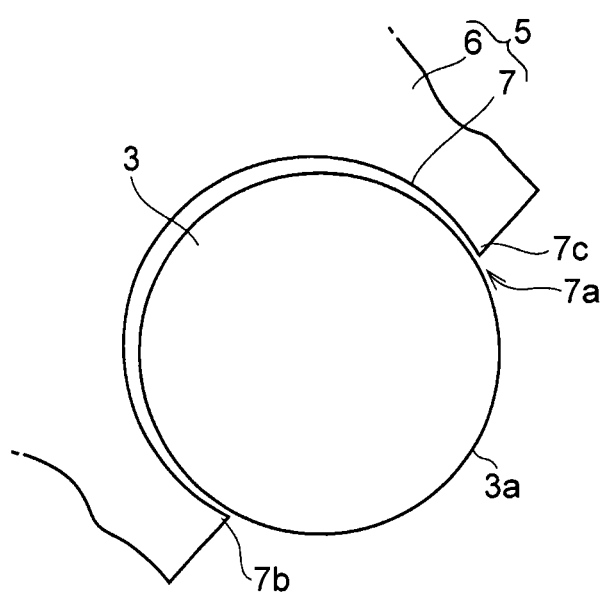
FIG. 2 is a view illustrating an accommodating portion of the connection member according to the first embodiment in an enlarged manner.

FIG. 2 is a view illustrating the accommodating portion of the connection member according to the first embodiment in an enlarged manner. As described above, the accommodating portion 7 is formed opening outward in the radial direction of the rotating body 1. A portion of the outer peripheral surface 3a of the rolling body 3 is exposed from an opening portion 7a that opens outward in the radial direction. Accordingly, when the rolling body 3 moves outward in the radial direction of the rotating body 1 by a centrifugal force, a portion of the outer peripheral surface 3a of the rolling body 3 is exposed from the opening portion 7a, and the exposed outer peripheral surface 3a is pressed against the rolling surface 4.

In the example shown therein, portions of the inner surface of the accommodating portion 7 on the outer side in the radial direction of the rotating body 1, that is, opposite end portions of the opening portion 7a in the circumferential direction of the rotating body 1 have arc surfaces having a larger radius of curvature than a radius of curvature of the rolling body 3 so as to come into point contact or line contact with the outer peripheral surface of the rolling body 3. In the following description, the opposite end portions of the opening portion 7a are referred to as contact portions 7b, 7c. The accommodating portion 7 is also formed such that the contact portions 7b, 7c are disposed on the outer side with respect to the center of gravity of the rolling body 3 in the radial direction of the rotating body 1 and on opposite sides of the center of gravity in the circumferential direction of the rotating body 1 when the rolling body 3 is moved to a position farthest from the center of the rotating body 1 in the guide hole 2 by a centrifugal force. Accordingly, it is possible to suppress escape of the rolling body 3 from the accommodating portion 7 of the connection member 5 to the outer side in the radial direction of the rotating body 1, and generation of abnormal sound with the escaped rolling body 3 colliding with the inner surface of the guide hole 2. When the rolling body 3 reciprocates, the contact portions 7b, 7c alternately come into point contact or line contact with the outer peripheral surface 3a of the rolling body 3.

As shown in FIG. 3, a portion of the rotating body 1 from a radially intermediate portion up to an outer peripheral end is surrounded by a casing 8. The guide holes 2, the rolling bodies 3, and the connection member 5 are disposed in a hollow portion of the casing 8. The casing 8 is composed of a first case member 8a and a second case member 8b that, for example, are recessed in the axial direction of the rotating body 1 and entirely formed in an annular shape. Inner peripheral side portions of the case members 8a, 8b are positioned close to each other to sandwich an inner peripheral portion of the rotating body 1. The case members 8a, 8b are thereby integrated with the rotating body 1. An end portion on an outer peripheral side of the first case member 8a covers an outer peripheral end surface of the rotating body 1 and extends toward the second case member 8b. Outer peripheral end portions of the case members 8a, 8b are integrated together.

An operation and an effect of the torsional vibration reducing device having the above configuration will be described. When the rotating body 1 rotates, the rolling body 3 is moved to a position farthest from the center of the rotating body 1 in the guide hole 2 by a centrifugal force. The connection member 5 is pressed and moved along with the movement of the rolling body 3. When the torque of the rotating body 1 fluctuates, the rolling body 3 reciprocates within the guide hole 2, that is, in a state in which the rolling body 3 is pressed against the rolling surface 4 by an inertial force. Torsional vibration of the rotating body 1 is reduced by the reciprocation of the rolling body 3 as described above. The connection member 5 reciprocates along with the reciprocation of the rolling body 3. In this case, each of the contact portions 7b, 7c of the connection member 5 comes into point contact or line contact with the outer peripheral surface 3a of the rolling body 3. Therefore, a contact area between the rolling body 3 and the connection member 5 can be reduced as compared to a case in which the connection member 5 is disposed along the side surface of the rolling body 3. Since the side surface of the connection member 5 and the side surface of the rolling body 3 are configured to be substantially flush with each other, contact between the side surface of the connection member 5 and an inner surface of the casing 8 can be also suppressed. As a result, it is possible to suppress sliding friction between the rolling body 3 and the connection member 5, and between the rolling body 3 or the connection member 5 and the casing 8. It is also possible to suppress a situation in which the sliding friction produces resistance to hinder the reciprocation of the rolling body 3. As a result, damping performance can be improved.

On the other hand, when the centrifugal force applied to the rolling body 3 is reduced along with a decrease in rotation speed of the rotating body 1 to be smaller than gravity applied to the rolling body 3, the rolling body 3 moves to a lower portion in the guide hole 2 by the gravity. In this case, for example, the rolling bodies 3 disposed on a right side in FIG. 1, and the other rolling bodies 3 disposed on an opposite side to the rolling bodies 3 with respect to a rotation center axis of the rotating body 1, that is, on a left side in FIG. 1 are balanced with each other. Therefore, even when the rolling body 3 moves to the lower portion by the gravity into contact with the inner surface of the guide hole 2, a load in the contact is small. As a result, generation of abnormal sound can be suppressed. Since the load is small, durability of the rolling body 3 and the rolling surface 4 can be improved.

In the torsional vibration reducing device having the above configuration, since the connection member 5 is overlappingly disposed on the inner side of the rolling body 3 in the radial direction of the rotating body 1, an increase in an axial length of the torsional vibration reducing device can be suppressed as compared to a case in which the connection member 5 is disposed along the side surface of the rolling body 3. Moreover, the connection member 5 holds the outer peripheral surface 3a of the rolling body 3. That is, it is not necessary to change a shape of the rolling body 3 in order to connect the plurality of rolling bodies 3. It is thus possible to facilitate design, production, and machining of the rolling body 3, and correspondingly suppress a cost of the rolling body 3.

Second Embodiment

Figure 4:
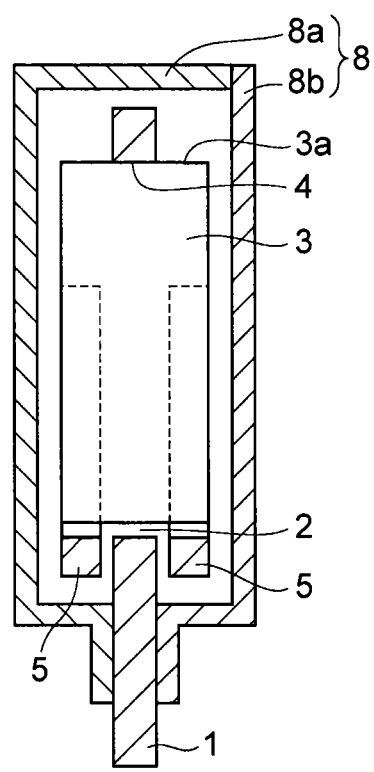
FIG. 4 is a sectional view in the rotating body radial direction illustrating a portion in one example of a torsional vibration reducing device according to a second embodiment.

FIG. 4 is a sectional view in the rotating body radial direction illustrating a portion in one example of a torsional vibration reducing device according to a second embodiment. The example shown therein is an example in which the connection members 5 are disposed on the inner side of the rolling body 3 in the radial direction of the rotating body 1 and on the opposite end portion sides of the rolling body 3 in the axial direction. In a configuration shown in FIG. 4, a load associated with contact between the outer peripheral surface 3a of the rolling body 3 and the connection members 5 is applied to the opposite end portions of the rolling body 3 in the axial direction. Therefore, the rolling body 3 can be more stably reciprocated than the example shown in FIG. 3, so that the damping performance is further improved.

Third Embodiment

Figure 5:
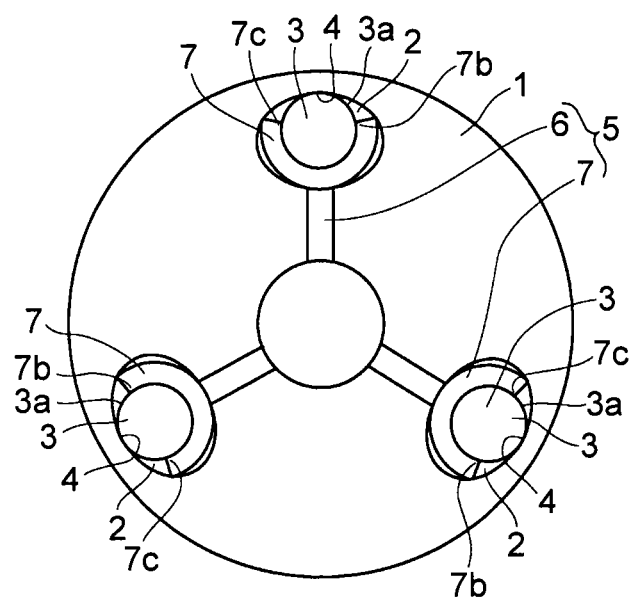
FIG. 5 is a view illustrating one example of a connection member according to a third embodiment.

FIG. 5 is a view illustrating one example of a connection member according to a third embodiment. In the example shown in FIG. 5, the three guide holes 2 are formed at predetermined intervals in the circumferential direction of the rotating body 1. The support portion 6 in the connection member 5 has a Y shape. The support portion 6 is formed such that free end portions are positioned corresponding to the guide holes 2, respectively. The accommodating portions 7 having the opening portions 7a that open outward in the radial direction of the rotating body 1 are provided at the free end portions, respectively.

Fourth Embodiment

Figure 6:
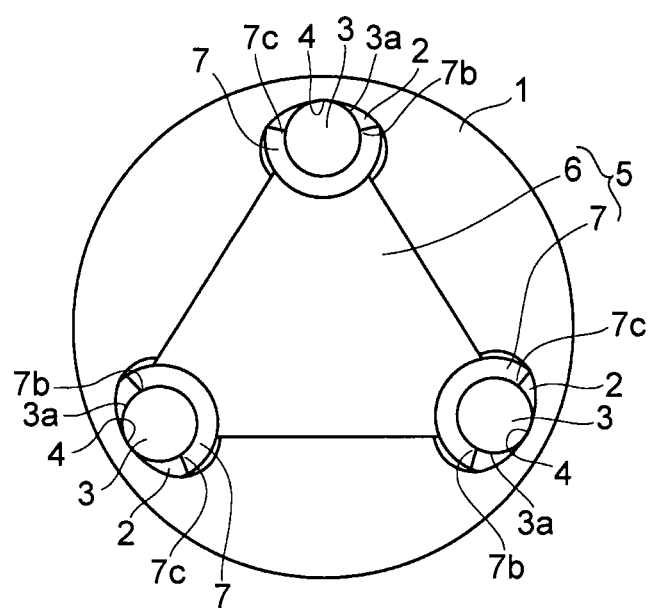
FIG. 6 is a view illustrating an example in which the connection member shown in FIG. 5 is partly changed.

FIG. 6 is a view illustrating an example in which the connection member shown in FIG. 5 is partly changed. The support portion 6 in the connection member 5 shown in FIG. 6 is formed in a substantially triangular shape whose apexes are positioned corresponding to the guide holes 2 of the rotating body 1. The accommodating portions 7 are provided at the apexes, respectively.

Fifth Embodiment

Figure 7:
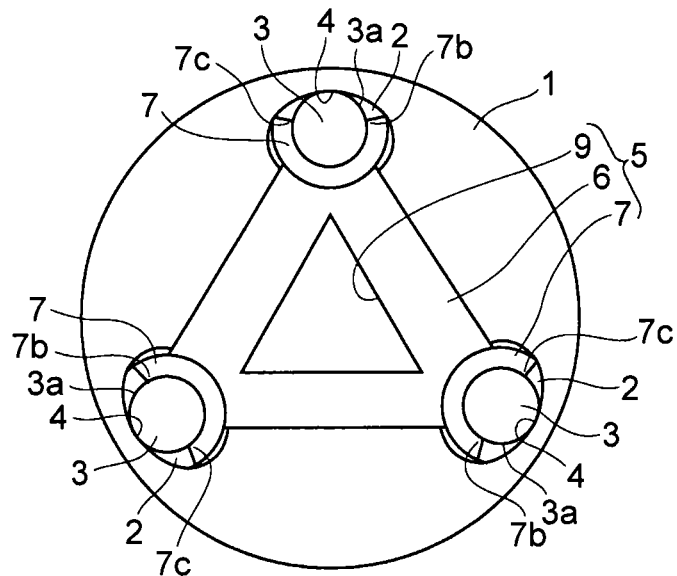
FIG. 7 is a view illustrating an example in which the connection member shown in FIG. 6 is partly changed.

Moreover, FIG. 7 is a view illustrating an example in which the connection member shown in FIG. 6 is partly changed. The support portion 6 in the connection member 5 shown in FIG. 7 is formed in a substantially triangular shape whose apexes are positioned corresponding to the guide holes 2 of the rotating body 1, and the accommodating portions 7 are provided at the apexes, respectively, similarly to the example shown in FIG. 6. A triangular through-hole 9 is also formed in a center portion of the support portion 6.

In configurations shown in FIGS. 5 to 7, each of the contact portions 7b, 7c of the connection member 5 also comes into point contact or line contact with the outer peripheral surface 3a of the rolling body 3. Therefore, a contact area between the rolling body 3 and the connection member 5 can be reduced, and sliding friction between the rolling body 3 and the connection member 5 can be reduced as compared to a case in which the connection member 5 is disposed along the side surface of the rolling body 3. As a result, it is possible to suppress a situation in which the sliding friction produces resistance to hinder the reciprocation of the rolling body 3, and improve the damping performance of the torsional vibration reducing device. When the connection members 5 shown in FIGS. 5 to 7 are disposed on one axial side of the rolling body 3, an operation and an effect similar to those of the configuration shown in FIG. 3 can be obtained. When the connection members 5 shown in FIGS. 5 to 7 are disposed on the opposite end portion sides of the rolling body 3 in the axial direction, an operation and an effect similar to those of the configuration shown in FIG. 4 can be obtained. Particularly, in the configuration shown FIG. 7, a material cost can be reduced, and a mass of the connection member 5 can be reduced by providing the through-hole 9 as compared to the configuration shown in FIG. 6.

Sixth Embodiment

Figure 8:
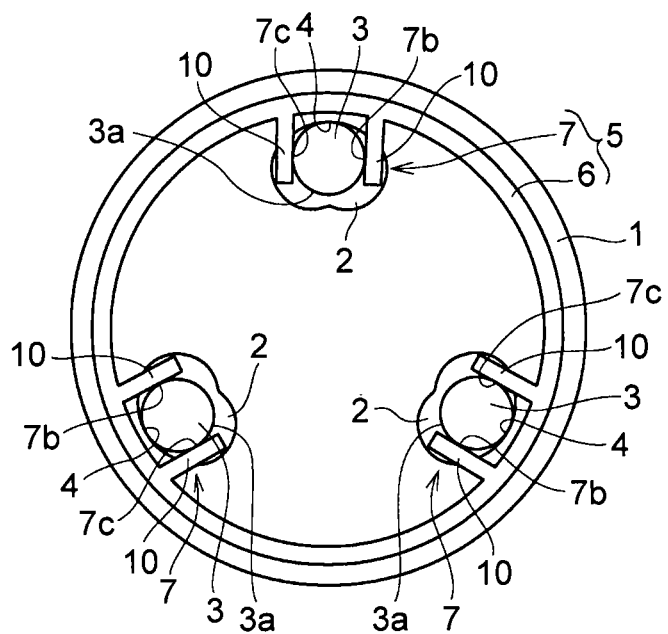
FIG. 8 is a view illustrating one example of a connection member according to a sixth embodiment.

FIG. 8 is a view illustrating one example of a connection member according to a sixth embodiment. The support portion 6 in the connection member 5 shown in FIG. 8 is formed in an annular shape. An outer diameter of the support portion 6 is slightly smaller than an outer diameter of the rotating body 1. A pair of partition walls 10 that extend inward in the radial direction of the support portion 6 are formed on an inner peripheral surface of the support portion 6 at a position corresponding to each of the guide holes 2. A length between the partition walls 10 is slightly larger than the outer diameter of the rolling bodies 3. A length of the partition walls 10 in the radial direction of the rotating body 1 is set to a length in which free end portions of the partition walls 10 are disposed on the inner side with respect to the center of gravity of each of the rolling bodies 3 in the radial direction of the rotating body 1 when the rolling body 3 is pressed against the rolling surface 4 by a centrifugal force. A portion surrounded by the pair of partition walls 10 and the inner peripheral surface of the support portion 6 is employed as the accommodating portion 7. That is, the accommodating portions 7 shown in FIG. 8 are formed in a channel shape opening inward in the radial direction of the rotating body 1. A portion between the free end portions of the pair of partition walls 10 is employed as the opening portion 7a. Portions of the partition walls 10 with which the outer peripheral surface 3a of the rolling body 3 comes into contact are employed as the contact portions 7b, 7c. Note that the support portion 6 is configured in a size in which the rolling body 3 does not come into contact with the inner peripheral surface of the support portion 6 when the rolling body 3 is pressed against the rolling surface 4 by a centrifugal force.

Seventh Embodiment

Figure 9:
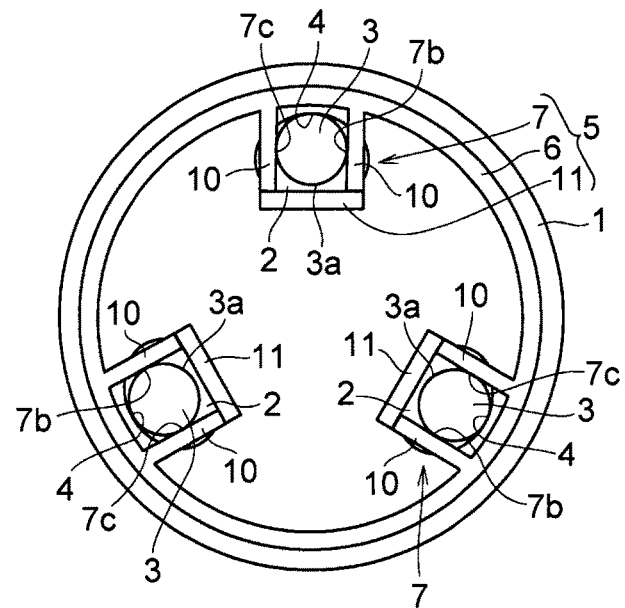
FIG. 9 is a view illustrating an example in which the connection member shown in FIG. 8 is partly changed.

FIG. 9 is a view illustrating an example in which the connection member shown in FIG. 8 is partly changed. The example shown therein is an example in which the opening portions 7a of the accommodating portions 7 shown in FIG. 8 are closed by lid members 11.

Eighth Embodiment

Figure 10:
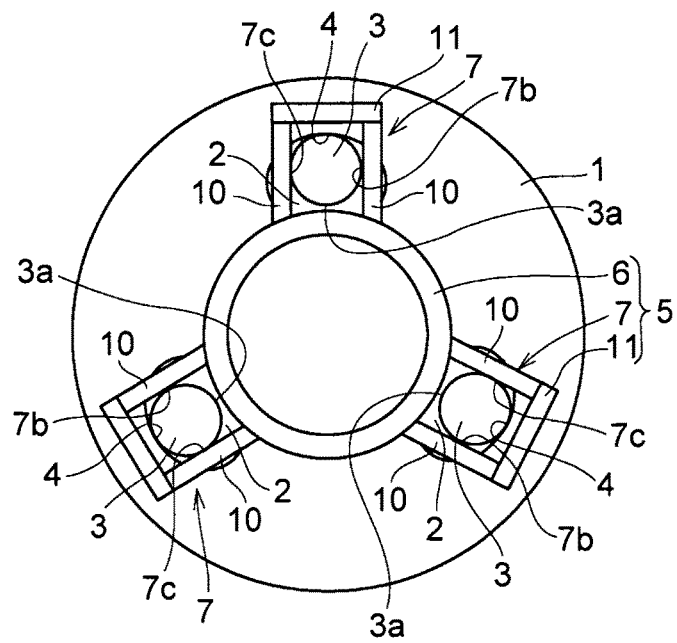
FIG. 10 is a view illustrating an example in which the connection member shown in FIG. 9 is partly changed.

FIG. 10 is a view illustrating an example in which the connection member shown in FIG. 9 is partly changed. The support portion 6 in the connection member 5 shown in FIG. 9 is formed in an annular shape having a smaller diameter than that of the support portions 6 shown in FIG. 8 and FIG. 9. The pair of partition walls 10 that extend outward in the radial direction of the support portion 6 are formed on an outer peripheral surface of the support portion 6 at a position corresponding to each of the guide holes 2. Free end portions of the pair of partition walls 10 are connected by the lid member 11. A length between the partition walls 10 is slightly larger than the outer diameter of the rolling bodies 3. A length of the partition walls 10 in the radial direction of the rotating body 1 is set to a length in which the free end portions of the partition walls 10 are disposed on the outer side with respect to the center of gravity of each of the rolling bodies 3 in the radial direction of the rotating body 1 when the rolling body 3 is pressed against the rolling surface 4 by a centrifugal force. The length of the partition walls 10 is also set to a length in which the lid member 11 does not come into contact with the rolling body 3 when the rolling body 3 is pressed against the rolling surface 4 by a centrifugal force. That is, a portion surrounded by the support portion 6, the pair of partition walls 10, and the lid member 11 is employed as the accommodating portion 7. Portions of the partition walls 10 with which the outer peripheral surface 3a of the rolling body 3 comes into contact are employed as the contact portions 7b, 7c.

In configurations shown in FIGS. 8 to 10, the contact portions 7b, 7c in the partition walls 10 of the connection member 5 also come into point contact or line contact with the outer peripheral surface 3a of the rolling body 3. Therefore, a contact area between the rolling body 3 and the connection member 5 can be reduced, and sliding friction between the rolling body 3 and the connection member 5 can be reduced as compared to a case in which the connection member 5 is disposed along the side surface of the rolling body 3. As a result, it is possible to suppress a situation in which the sliding friction produces resistance to hinder the reciprocation of the rolling body 3, and improve the damping performance of the torsional vibration reducing device. When the connection members 5 shown in FIGS. 8 to 10 are disposed on one axial side of the rolling body 3, an operation and an effect similar to those of the configuration shown in FIG. 3 can be obtained. When the connection members 5 shown in FIGS. 8 to 10 are disposed on the opposite end portion sides of the rolling body 3 in the axial direction, an operation and an effect similar to those of the configuration shown in FIG. 4 can be obtained.

Ninth Embodiment

Figure 11:
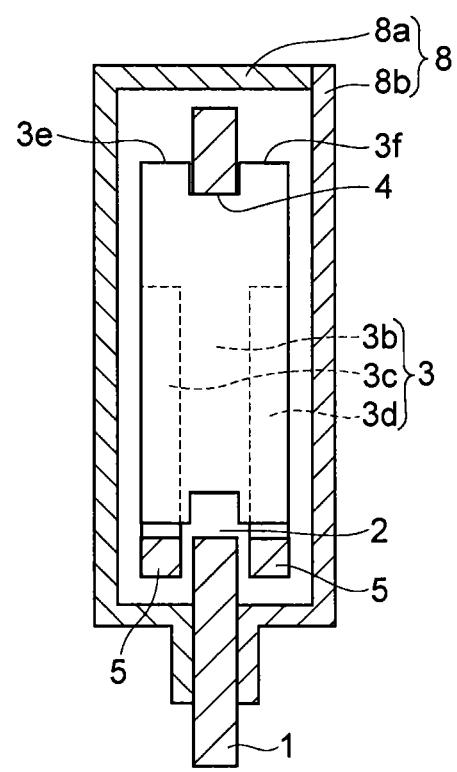
FIG. 11 is a view illustrating an example in which the torsional vibration reducing device shown in FIG. 4 is partly changed.

FIG. 11 is a view illustrating an example in which the torsional vibration reducing device shown in FIG. 4 is partly changed. The example shown therein is an example in which the rolling body 3 having an "H" shape in section is used instead of the rolling body having a simple disk or cylindrical shape in section. To be more specific, the rolling body 3 has a disk-shaped or cylindrical-shaped body portion 3b, and disk-shaped flange portions 3c, 3d having a larger outer diameter than an outer diameter of the body portion 3b are provided on opposite end portions of the body portion 3b. Therefore, the flange portions 3c, 3d are caught by the side surfaces of the rotating body 1, so that it is difficult for the rolling body 3 to escape in the rotation axial direction of the rotating body 1. The connection members 5 are also disposed on opposite sides of the rotating body 1, respectively. Outer peripheral surfaces 3e, 3f of the flange portions 3c, 3d are held by the accommodating portions 7 of the connection members 5, respectively.

In a configuration shown in FIG. 11, the contact portions 7b, 7c of each of the accommodating portions 7 also come into point contact or line contact with each of the outer peripheral surfaces 3e, 3f of the flange portions 3c, 3d. Therefore, a contact area between the rolling body 3 and the connection members 5 can be reduced, and sliding friction between the rolling body 3 and the connection members 5 can be reduced as compared to a case in which the connection member 5 is disposed along the side surface of the rolling body 3. As a result, it is possible to suppress a situation in which the sliding friction produces resistance to hinder the reciprocation of the rolling body 3, and improve the damping performance of the torsional vibration reducing device. A load associated with contact between the outer peripheral surfaces 3e, 3f of the flange portions 3c, 3d and the connection members 5 is applied to the opposite end portions of the "H"-shaped rolling body 3 in the axial direction. The rolling body 3 can be thereby stably reciprocated. That is, in the configuration shown in FIG. 11, an operation and an effect similar to those of the configuration shown in FIG. 4 can be also obtained.

Note that the rolling surface 4 may be continuously formed in the circumferential direction of the rotating body 1. That is, a hollow portion passing through the rotating body 1 in the plate thickness direction is formed throughout an entire periphery of the rotating body 1, and an inner surface of the annular hollow portion on the outer side in the radial direction of the rotating body 1 is formed as a curved surface that is changed into concave and convex shapes continuously in the circumferential direction of the rotating body 1. An inner surface of the hollow portion on the inner side in the radial direction of the rotating body 1 is a simple arc surface. A portion defined between portions with a small space between the surface on an outer peripheral side and the surface on an inner peripheral side may be employed as the guide hole 2 as described above into which the rolling body 3 is inserted.

Note that the connection member 5 is not limited to the configuration in which the contact portions 7b, 7c are provided on the outer side with respect to the center of gravity of the rolling body 3 in the radial direction of the rotating body 1 as described above. For example, the contact portions 7b, 7c may be disposed at substantially the same positions as the center of gravity of the rolling body 3 in the radial direction of the rotating body 1. In short, the contact portions 7b, 7c only need to be in point contact or line contact with the outer peripheral surface 3a of the rolling body 3 or the outer peripheral surfaces 3e, 3f of the flange portions 3c, 3d.

What is claimed is:

1. A torsional vibration reducing device comprising:
    a rotating body configured to receive torque and rotate, the rotating body having a plurality of guide holes, the plurality of guide holes being provided at a predetermined interval in a circumferential direction of the rotating body, and the plurality of guide holes each including a rolling surface;
    a plurality of rolling bodies accommodated in the plurality of guide holes, respectively, each of the plurality of rolling bodies being configured to reciprocate in the circumferential direction of the rotating body when the torque fluctuates in a state in which the rotating body is rotating, the plurality of rolling bodies including an outer peripheral surface that contacts the rolling surface of the respective plurality of guide holes; and
    a connection member that connects the plurality of rolling bodies, the connection member including a plurality of accommodating portions, at least two contact portions being positioned on an inner surface of each of the plurality of accommodating portions, a portion of the outer peripheral surface of each of the plurality of rolling bodies being positioned in each of the plurality of accommodating portions, and the outer peripheral surface of each of the plurality of rolling bodies being configured to come into point contact with only one of the contact portions in the circumferential direction of the rotating body when the rotating body rotates.

2. The torsional vibration reducing device according to claim 1, wherein
    each of the contact portions is configured to come into contact with the outer peripheral surface of each of the plurality of rolling bodies at a position on an outer side with respect to a center of gravity of each of the rolling bodies in a radial direction of the rotating body and on opposite sides of the center of gravity in the circumferential direction of the rotating body.

3. The torsional vibration reducing device according to claim 1, wherein
    the connection member is disposed on each of opposite sides of the rotating body in an axial direction of the rotating body.

4. The torsional vibration reducing device according to claim 3, wherein
    the rolling surface being a surface on an outer side in a radial direction of the rotating body in an inner surface of each of the plurality of guide holes, and
    each of the plurality of rolling bodies includes a body portion and a flange portion, the body portion having a cylindrical shape, a length of the body portion in the axial direction of the rotating body being larger than a width of the rolling surface, the flange portion having a disk shape, the flange portion being provided on opposite end portions of the body portion in the axial direction of the rotating body, and the plurality of accommodating portions holding the plurality of rolling bodies in contact with outer peripheral surfaces of the flange portions.

5. The torsional vibration reducing device according to claim 1, wherein the plurality of accommodating portions each has an arc shape and the contact portions are at respective ends of the arc shape.

6. The torsional vibration reducing device according to claim 1, wherein the plurality of rolling bodies each has a circular cross-section along an entire length of the respective rolling body.

7. A torsional vibration reducing device comprising:

a rotating body configured to receive torque and rotate, the rotating body having a plurality of guide holes, the plurality of guide holes being provided at a predetermined interval in a circumferential direction of the rotating body, and the plurality of guide holes each including a rolling surface;

a plurality of rolling bodies that are accommodated in the plurality of guide holes, respectively, each of the plurality of rolling bodies being configured to reciprocate in the circumferential direction of the rotating body when the torque fluctuates in a state in which the rotating body is rotating, the plurality of rolling bodies including an outer peripheral surface that contacts the rolling surface of the respective plurality of guide holes; and a connection member that connects the plurality of rolling bodies, the connection member including a plurality of accommodating portions, at least two contact portions being positioned on an inner surface of each of the plurality of accommodating portions, a portion of the outer peripheral surface of each of the plurality of rolling bodies being positioned in each of the plurality of accommodating portions, and the outer peripheral surface of each of the plurality of rolling bodies being configured to come into line contact with only one of the contact portions in the circumferential direction of the rotating body when the rotating body rotates.

8. The torsional vibration reducing device according to claim 7, wherein each of the contact portions is configured to come into contact with the outer peripheral surface of each of the plurality of rolling bodies at a position on an outer side with respect to a center of gravity of each of the rolling bodies in a radial direction of the rotating body and on opposite sides of the center of gravity in the circumferential direction of the rotating body.

9. The torsional vibration reducing device according to claim 7, wherein the connection member is disposed on each of opposite sides of the rotating body in an axial direction of the rotating body.

10. The torsional vibration reducing device according to claim 9, wherein the rolling surface being a surface on an outer side in a radial direction of the rotating body in an inner surface of each of the plurality of guide holes, and each of the plurality of rolling bodies includes a body portion and a flange portion, the body portion having a cylindrical shape, a length of the body portion in the axial direction of the rotating body being larger than a width of the rolling surface, the flange portion having a disk shape, the flange portion being provided on opposite end portions of the body portion in the axial direction of the rotating body, and the plurality of accommodating portions holding the plurality of rolling bodies in contact with outer peripheral surfaces of the flange portions.

* * * * *